United States Patent
Ryu et al.

(10) Patent No.: US 7,447,628 B2
(45) Date of Patent: Nov. 4, 2008

(54) VERB PATTERN AUTOMATIC EXTENSION AND VERIFICATION APPARATUS AND METHOD FOR USE IN KOREAN-CHINESE MACHINE TRANSLATION SYSTEM

(75) Inventors: Cheol Ryu, Taejon (KR); Munpyo Hong, Taejon (KR); Sang Kyu Park, Taejon (KR); Young Kil Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 889 days.

(21) Appl. No.: 10/892,268

(22) Filed: Jul. 16, 2004

(65) Prior Publication Data

US 2005/0137851 A1    Jun. 23, 2005

(30) Foreign Application Priority Data

Dec. 19, 2003   (KR)   ................. 10-2003-0094025

(51) Int. Cl.
    *G06F 17/27*   (2006.01)
(52) U.S. Cl. .................... 704/10; 704/9; 704/2
(58) Field of Classification Search ............ 704/1, 704/2, 4, 5, 6, 7, 8, 9, 10, 277, 270, 257
    See application file for complete search history.

(56) References Cited

U.S. PATENT DOCUMENTS 5,878,385 A * 3/1999 Bralich et al. ............ 704/9

2003/0061023 A1  3/2003  Menezes et al.

FOREIGN PATENT DOCUMENTS

KR       2000-38079        7/2000

OTHER PUBLICATIONS

Timothy Baldwin, et al.; "Alternation-based Lexicon Reconstruction".

* cited by examiner

*Primary Examiner*—Huyen X. Vo
(74) *Attorney, Agent, or Firm*—Lowe Hauptman Ham & Berner, LLP

(57) ABSTRACT

A verb pattern automatic extension and verification apparatus for use in a Korean-Chinese machine translation system automatically extracts the verb pattern source part that is not applied with the verb pattern contained in the current Korean and Chinese pattern dictionary, and automatically generates the new Korean-Chinese verb pattern based on Chinese target language. The apparatus further automatically extends one newly generated Korean-Chinese verb pattern to a plurality of similar verb pattern candidates, and newly registers the newly-generated and extended Korean-Chinese verb patterns in the Korean and Chinese verb pattern dictionary database. Accordingly, it is possible to easily and automatically collect a large quantity of the Korean and Chinese verb patterns. Further, the translation rate of the Korean-Chinese machine translation system can be rapidly increased due to the automatically increasing verb patterns.

5 Claims, 2 Drawing Sheets

VERB PATTERN AUTOMATIC EXTENSION AND VERIFICATION APPARATUS AND METHOD FOR USE IN KOREAN-CHINESE MACHINE TRANSLATION SYSTEM

BACKGROUND OF THE INVENTION

1. Field of the Invention

The present invention relates to a Korean-Chinese machine translation system, and more particularly, to a verb pattern automatic extension and verification apparatus and method for use in a Korean-Chinese machine translation system, in which verb patterns are generated automatically.

2. Description of the Related Art

The advance of computer system and computer network makes it possible to obtain and process a large quantity of corpus and establish a database (DB). Accordingly, great progress has been made in a methodology for automatic translation between different languages (e.g., Korean and Chinese).

For example, as one of attempts to extract information used in the automatic translation from a raw corpus, a method for extracting statistical information based on "n-gram" is well known. Because this method establishes a terminology dictionary for the automatic translation and provides the statistical information, an accuracy of the automatic translation is increased.

In addition, a method for automatically extracting a transfer rule from a parallel corpus is known as an effective method for establishing language translation knowledge. However, its accuracy is unsatisfactory.

Meanwhile, an acquisition of an abundant verb pattern dictionary in the automatic translation plays an important role in an improvement in a quality of the automatic translation. Therefore, as a specific language is changing with a reflection of the times and society, an extension of verb patterns is necessary every when terminology and usage are changed and new expressions continue to appear.

In a conventional automatic translation, however, the acquisition of basic verb patterns is carried out by dictionary knowledge establishers, called "lexicographer". Therefore, there is a limit when a large quantity of verb patterns is established.

Specifically, since a conventional Korean-Chinese machine translation system based on verb patterns makes use of verb patterns that are manually implemented in an off-line mode by the lexicographers, an efficiency of the verb pattern establishment is lowered. Further, since a coverage problem is caused due to an absolute shortage of the number of the verb patterns. Consequently, the conventional Korean-Chinese machine translation system has a disadvantage in which the highest performance cannot be obtained.

SUMMARY OF THE INVENTION

Accordingly, the present invention is directed to a verb pattern automatic extension and verification apparatus and method for use in a Korean-Chinese machine translation system which substantially obviates one or more problems due to limitations and disadvantages of the related art.

It is an object of the present invention to provide a verb pattern automatic extension and verification apparatus and method, in which a large quantity of Korean and Chinese verb pattern dictionary used as an automatic translation in a Korean-Chinese machine translation system is secured.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a verb pattern automatic extension and verification apparatus for use in a Korean-Chinese machine translation system, comprising: a verb pattern dictionary database in which Korean and Chinese verb patterns are registered; a sentence structure parser for parsing respective sentence structures contained in a newly inputted Korean raw corpus and detecting a verb pattern that is unregistered in the current verb pattern dictionary database among the verb patterns contained in the respective sentences; and a verb pattern generator for automatically generating a source sentence part of the unregistered verb pattern detected by the sentence structure parser, searching a Chinese verb target language corresponding to the verb pattern of the source sentence part in the verb pattern dictionary database to automatically generate a Chinese target sentence part, automatically generating a new verb pattern to newly register the new verb pattern in the verb pattern dictionary database, performing a pattern extension process of checking an identification of voice, a lexical pattern and a Chinese target language with respect to the new verb pattern and the Korean verb pattern having a target language identical to the Chinese verb target language, adding a specific verb pattern candidate, performing an automatic error verification process of judging whether or not the extended verb pattern candidate is registered in a large-capacity corpus database, newly registering the extended verb pattern judged as a suitable pattern in the Korean and Chinese verb pattern dictionary database, and registering the extended verb pattern judged as the error pattern in an error pattern database.

In another aspect of the present invention, there is provided a verb pattern automatic extension and verification method for use in a Korean-Chinese machine translation system, in which the method uses the apparatus of claim 1, comprising the steps of: (a) parsing respective sentence structures contained in a newly inputted Korean raw corpus, detecting a verb pattern that is unregistered in the current verb pattern dictionary database among the verb patterns contained in the respective sentences, and automatically generating a source sentence part of the detected unregistered verb pattern; (b) searching a Chinese verb target language corresponding to the verb pattern of the source sentence part in the verb pattern dictionary database to automatically generate a Chinese target sentence part, automatically generating a new verb pattern, and newly registering the new verb pattern in the verb pattern dictionary database; (c) performing a pattern extension process of checking an identification of voice, a lexical pattern and a Chinese target language with respect to the new verb pattern and the Korean verb pattern having a target language identical to the Chinese verb target language, and adding a specific verb pattern candidate; and (d) performing an automatic error verification process of judging whether or not the extended verb pattern candidate is registered in a large-capacity corpus database, newly registering the extended verb pattern judged as a suitable pattern in the Korean and Chinese verb pattern dictionary database, and registering the extended verb pattern judged as the error pattern in an error pattern database.

In further another aspect of the present invention, there is provided a computer-readable medium storing a program executed on a computer to perform the verb pattern automatic extension and verification method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
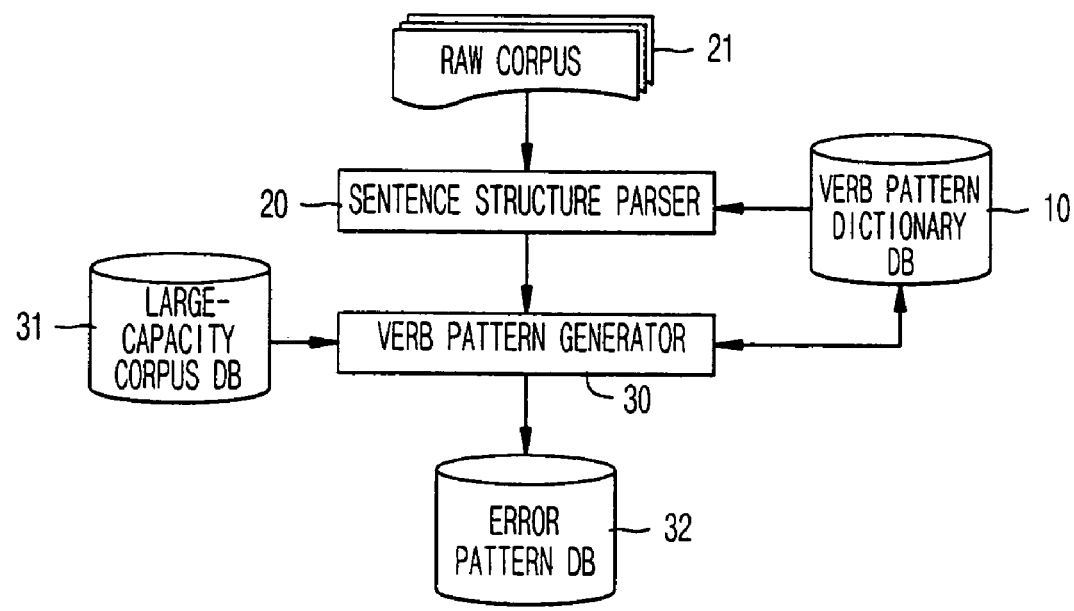
FIG. 1 shows a construction of a verb pattern automatic extension and verification apparatus for use in a Korean-Chinese machine translation system according to the present invention.

FIG. 1 illustrates a construction of a verb pattern automatic extension and verification apparatus for use in a Korean-Chinese machine translation system according to the present invention.

Referring to FIG. 1, Korean and Chinese verb patterns are registered in a verb pattern dictionary database 10.

A sentence structure parser 20 parses in a newly inputted sentence contained Korean raw corpus 21, and then detects a verb pattern that is unregistered in the current verb pattern dictionary database 10 among the verb patterns contained in the respective sentences.

A verb pattern generator 30 automatically generates a source verb pattern of the unregistered verb pattern detected by the sentence structure parser 20 and then searches a translated Chinese verb word in the target verb pattern corresponding to the verb pattern of the source sentence part in the verb pattern dictionary database 10 to automatically generate a Chinese target sentence part. Then, the verb pattern generator 30 automatically generates a new verb pattern and newly registers it in the verb pattern dictionary database 10.

The verb pattern generator 30 performs a pattern extension process to add a specific verb pattern candidate. The pattern extension process consists of the following three steps:
1. Checking the identification of voice of Korean and Chinese
2. Checking if a lexical pattern is copied or not
3. Checking if the support verb in Chinese is included or not
   Only if all the above-mentioned three conditions are met, the automatic pattern generation process based on translation equivalency is activated.

The verb pattern generator 30 performs an automatic error verification process of judging whether or not the extended verb pattern candidate is registered in a large-capacity corpus database 31. Then, the verb pattern generator 30 newly registers the extended verb pattern judged as a suitable pattern in the Korean and Chinese verb pattern dictionary database 10 and registers the extended verb pattern judged as the error pattern in an error pattern database 32.

As the result of the above automatic error verification process, the verb pattern generator 30 requests a manual verification to the lexicographer with respect to the extended verb pattern candidate judged as the error pattern.

If the lexicographer's verification result that the extended verb pattern candidate judged as the error pattern is suitable is inputted, the verb pattern generator 30 newly registers the corresponding verb pattern in the Korean and Chinese verb pattern dictionary database 10. Meanwhile, if the lexicographer's verification result that the extended verb pattern candidate is the error pattern is inputted, the verb pattern generator 30 registers the judged extended verb pattern in the error pattern database 32.

When the verb pattern generator 30 automatically generates the new verb pattern and then extends it, the error patterns registered in the error pattern database 32 are excluded from rear-portion patterns processed by the lexicographer.

Hereinafter, an operation of the verb pattern automatic extension and verification apparatus for use in the Korean-Chinese machine translation system according to the present invention will be described with reference to FIG. 2.

Figure 2:
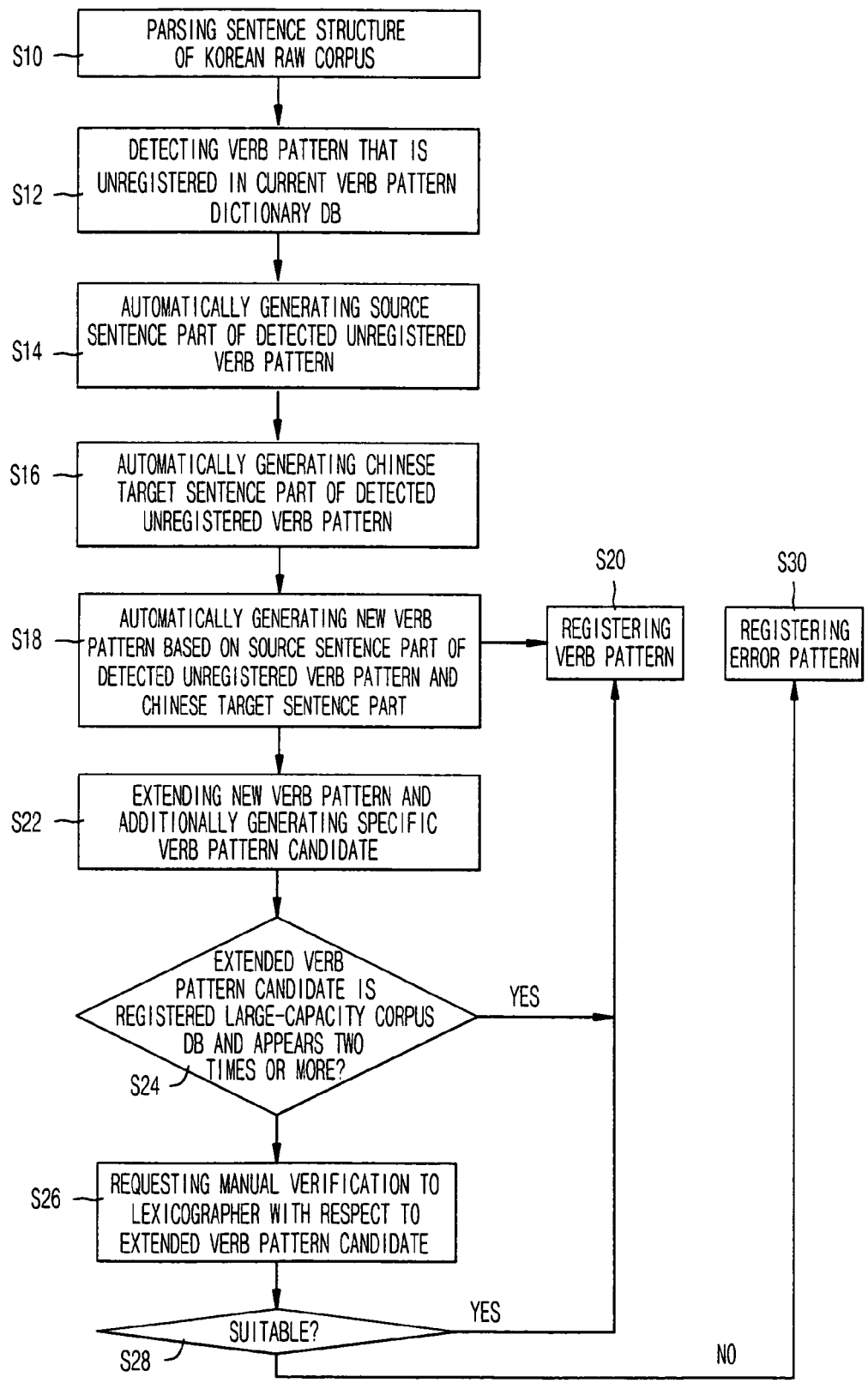
FIG. 2 is a flowchart illustrating a verb pattern automatic extension and verification method for use in a Korean-Chinese machine translation system according to the present invention.

Referring to FIG. 2, first, the sentence structure parser 20 parses respective sentence structures contained in a newly inputted Korean raw corpus 21 (S10), and then detects a verb pattern that is unregistered in the current verb pattern dictionary database 10 among the verb patterns contained in the respective sentences (S12). The detected unregistered verb pattern is transmitted to the verb pattern generator 30.

At this time, through the structure parsing of the respective sentences contained in the raw corpus 21, the sentence structure parser 20 can determine whether the verb pattern contained in the respective sentences is matched because the verb pattern is registered in the current verb pattern dictionary database 10, or partially matched, or unmatched.

Here, the word "matched" means that the verb pattern exists as a pattern in which a "case" component connected to the verb pattern exactly coincides with the current verb pattern dictionary database 10. The word "partially matched" means that the verb pattern exists in the current verb pattern dictionary database 10 as a form of a pattern in which some portions of the "case" component connected to the verb pattern are partially matched. Meanwhile, the word "unmatched" means that a pattern having a "case" component connected to the verb pattern does not exist in the current verb pattern dictionary database 10.

The verb pattern generator 30 automatically generates a verb pattern source sentence part from the unregistered verb pattern detected by the sentence structure parser 20 (S14), and then searches a Chinese verb target language corresponding to the verb pattern of the source sentence part in the verb pattern dictionary database 10 to automatically generate a Chinese target sentence part (S16). Then, the verb pattern generator 30 automatically generates a new verb pattern (S18) and newly registers it in the verb pattern dictionary database 10 (S20).

For example, if a Korean sentence "나는 새 자동차를 아버지 께 드렸다." contained in the raw corpus 21 fails in the matching operation performed by the sentence structure parser 20 based on the verb pattern, the verb pattern generator 30 designates a semantic code "사람" of "나" as a variable "A" and designates a semantic code "자동차" of "새 자동차" as a variable "B". As a result, the completed source sentence part is given as below.

A=사람!가 B=자동차!를 드리!다

Then, using the variables A and B and an expression of Chinese verb target language registered in the verb pattern dictionary database 10, a target sentence part is constructed as below.

A給B

Finally, a new verb pattern based on a raw corpus 21 is automatically generated as below by putting together the source sentence part and the target sentence part, and then the new verb pattern is registered in the verb pattern dictionary database 10.

A=사람!가 B=자동차!를 드리!다>A給B

Once the new verb pattern based on the raw corpus 21 is automatically generated, the verb pattern generator 30 performs the pattern extension process to newly add a plurality of specific verb pattern candidates (S22). Here, the pattern extension process is a process for checking an identification of voice, a lexical pattern and a Chinese target language with respect to the new verb pattern and the Korean verb pattern having a target language identical to the Chinese verb target language. Then, the specific verb pattern candidates are registered in the verb pattern dictionary database 10 through the automatic verification and manual verification processes.

The verb pattern generator 30 performs the pattern extension process in a following manner.

First Step: Chinese verb of the target sentence part of the to-be-registered verb pattern is searched in the previously registered Korean-Chinese verb pattern.

If the new verb pattern that is automatically generated by the verb pattern generator 30 is as below, the verb pattern generator 30 searches the Chinese verb "給".

A=사람!가 B=자동차!를 드리!다>A給B

Second Step: After the specific Chinese verb (e.g., 給) is founded, Korean patterns having an identical Chinese verb (target language) and a different entry are compared in one-to-one. In other words, in case the n number of Korean patterns exists below one final verb, n(n−1)/2 pairs are compared with each other.

For example, if patterns having the identical Chinese target language with respect to the Chinese verb "給" are compared with each other, Korean patterns are compared with each other as below.

A=사람!가 B=자동차!를 드리!다

A=사람!가 B=사람!에게 C=채소!를 주!다

A=사람!가 B=계화!를 수여하!다

Third Step: If the compared Korean patterns satisfy the following three conditions, Korean verb pattern located below a different Korean entry is replaced using its own entry.

Condition 1) comparison objects, two Korean verb entries, have the same voice.

Condition 2) none of comparison objects, two Korean verbs, is the lexical patterns.

Condition 3) Chinese verb is not 加以, 進行, 做 and 作.

For example, replacement: A=사람!가 B=사람!에게 C=채소!를 드리!다

The additional extended pattern "A=사람!가 B=사람!에게 C=채소!를 드리!다" is automatically generated from the verb pattern "A=사람!가 B=자동차!를 드리!다>A給B" that is newly generated through the above procedures by the verb pattern generator 30.

After the extended pattern is generated as above, the verb pattern generator 30 performs the automatic error verification process of judging whether or not the extended verb pattern candidate is registered in a large-capacity corpus database 31 in order to improve the accuracy of the extended verb pattern (S24). The extended verb pattern judged as a suitable pattern is newly registered in the Korean and Chinese verb pattern dictionary database 10 (S20).

At this time, the verb pattern generator 30 attempts the pattern matching with respect to the large-capacity corpus database 31. If the extended verb pattern appears in the large-capacity corpus database 31 two times or more (S24), the extended verb pattern is judged as the correct pattern and directly registered in the verb pattern dictionary database 10. If not, the manual verification is requested for inquiring the lexicographer of Korean-Chinese machine translation system about the suitability of the generated extended verb pattern candidate (S26).

At this time, if the extended verb pattern candidate verified by the lexicographer is judged as a suitable pattern (S28), the corresponding extended verb pattern candidate is registered in the verb pattern dictionary database 10 (S20).

Meanwhile, if the extended verb pattern candidate is judged as the error pattern (S28), the corresponding extended verb pattern candidate is registered in the error pattern database 32, not in the verb pattern dictionary database 10 (S30)

As described above, the verb patterns registered in the error pattern database 32 are not directly erased, but function to prevent these patterns from being generated automatically.

Actually, if these error patterns are automatically excluded before the verification when the lexicographer performs the manual verification operation later, the number of the extended pattern candidates can be reduced. If the error is previously excluded in this manner, a work of the lexicographer is reduced. As a result, the verb patterns can be registered much more.

As described above, the verb pattern automatic extension and verification apparatus for use in the Korean-Chinese machine translation system according to the present invention automatically extracts the verb pattern source part that is not applied with the verb pattern contained in the current Korean and Chinese pattern dictionary, and automatically generates the new Korean-Chinese verb pattern based on translated Chinese word. Meanwhile, the verb pattern automatic extension and verification apparatus according to the present invention automatically extends one newly generated Korean-Chinese verb pattern to a plurality of similar verb pattern candidates, and newly registers the newly-generated and extended Korean-Chinese verb patterns in the Korean and Chinese verb pattern dictionary database. Accordingly, it is possible to easily and automatically collect a large quantity of the Korean and Chinese verb patterns. Further, the translation rate of the Korean-Chinese machine translation system can be rapidly increased due to the automatically increasing verb patterns.

The verb pattern automatic extension and verification apparatus for use in the Korean-Chinese machine translation system according to the present invention performs the automatic verification operation based on the large-capacity corpus with respect to the automatically extended Korean-Chinese verb pattern. Then, the verb pattern automatic extension and verification apparatus separately stores the verb pattern judged as the error pattern in the error pattern database and then reuses it. Accordingly, the accuracy of the Korean and Chinese verb pattern can be increased. Further, the quality of the verb pattern automatically generated in the future can be improved gradually.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A verb pattern automatic extension and verification apparatus for use in a Korean-Chinese machine translation system, comprising:
    a verb pattern dictionary database in which Korean and Chinese verb patterns are registered;
    a sentence structure parser for parsing respective sentence structures contained in a newly inputted Korean raw corpus and detecting a verb pattern that is unregistered in the current verb pattern dictionary database among the verb patterns contained in the respective sentences; and
    a verb pattern generator for automatically generating a source sentence part of the unregistered verb pattern detected by the sentence structure parser, searching a Chinese verb target language corresponding to the verb pattern of the source sentence part in the verb pattern dictionary database to automatically generate a Chinese target sentence part, automatically generating a new verb pattern to newly register the new verb pattern in the verb pattern dictionary database, performing a pattern extension process of checking an identification of voice, a lexical pattern and a Chinese target language with respect to the new verb pattern and the Korean verb pattern having a target language identical to the Chinese verb target language, adding a specific verb pattern candidate, performing an automatic error verification process of judging whether or not the extended verb pattern candidate is registered in a large-capacity corpus database, newly registering the extended verb pattern judged as a suitable pattern in the Korean and Chinese verb pattern dictionary database, and registering the extended verb pattern judged as the error pattern in an error pattern database.

2. The verb pattern automatic extension and verification apparatus of claim 1, wherein the verb pattern generator requests a manual verification to a lexicographer with respect to the extended verb pattern candidate judged as the error pattern.

3. The verb pattern automatic extension and verification apparatus of claim 2, wherein if the lexicographer's verification result that the extended verb pattern candidate judged as the error pattern is suitable is inputted, the verb pattern generator newly registers the corresponding verb pattern in the Korean and Chinese verb pattern dictionary database, and if the lexicographer's verification result that the extended verb pattern candidate is the error pattern is inputted, the verb pattern generator registers the judged extend verb pattern in the error pattern database.

4. A verb pattern automatic extension and verification method for use in a Korean-Chinese machine translation system, in which the method uses the apparatus of claim 1, comprising the steps of:
    (a) parsing respective sentence structures contained in a newly inputted Korean raw corpus, detecting a verb pattern that is unregistered in the current verb pattern dictionary database among the verb patterns contained in the respective sentences, and automatically generating a source sentence part of the detected unregistered verb pattern;
    (b) searching a Chinese verb target language corresponding to the verb pattern of the source sentence part in the verb pattern dictionary database to automatically generate a Chinese target sentence part, automatically generating a new verb pattern, and newly registering the new verb pattern in the verb pattern dictionary database;
    (c) performing a pattern extension process of checking an identification of voice, a lexical pattern and a Chinese target language with respect to the new verb pattern and the Korean verb pattern having a target language identical to the Chinese verb target language, and adding a specific verb pattern candidate; and
    (d) performing an automatic error verification process of judging whether or not the extended verb pattern candidate is registered in a large-capacity corpus database, newly registering the extended verb pattern judged as a suitable pattern in the Korean and Chinese verb pattern dictionary database, and registering the extended verb pattern judged as the error pattern in an error pattern database.

5. The verb pattern automatic extension and verification method of claim 4, wherein the step (d) comprises the steps of:
    requesting a manual verification to the lexicographer with respect to the extended verb pattern candidate judged as the error pattern as the result of the automatic error verification process;
    if the lexicographer's verification result that the extended verb pattern candidate judged as the error pattern is suitable is inputted, newly registering the corresponding verb pattern in the Korean and Chinese verb pattern dictionary database; and
    if the lexicographer's verification result that the extended verb pattern candidate is the error pattern is inputted, registering the judged extend verb pattern in the error pattern database.

* * * * *